United States Patent
Park et al.

(10) Patent No.: US 8,284,722 B2
(45) Date of Patent: Oct. 9, 2012

(54) METHOD AND APPARATUS OF TRANSMITTING DATA IN A WIRELESS COMMUNICATION SYSTEM

(75) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 529 days.

(21) Appl. No.: 12/375,474

(22) PCT Filed: Feb. 5, 2008

(86) PCT No.: PCT/KR2008/000719
§ 371 (c)(1),
(2), (4) Date: Jan. 28, 2009

(87) PCT Pub. No.: WO2008/097019
PCT Pub. Date: Aug. 14, 2008

(65) Prior Publication Data
US 2010/0002638 A1    Jan. 7, 2010

Related U.S. Application Data

(60) Provisional application No. 60/888,508, filed on Feb. 6, 2007.

(30) Foreign Application Priority Data

Jan. 30, 2008    (KR) .................... 10-2008-0009666

(51) Int. Cl.
*H04W 4/00*    (2009.01)

(52) U.S. Cl. ......... 370/329; 370/437; 370/468; 709/226
(58) Field of Classification Search .................. None
See application file for complete search history.

(56) References Cited

U.S. PATENT DOCUMENTS

| | | |
|---|---|---|
| 6,697,347 B2 | 2/2004 | Ostman et al. |
| 7,006,464 B1 | 2/2006 | Gopalakrishnan et al. |
| 7,158,504 B2 | 1/2007 | Kadaba et al. |

(Continued)

FOREIGN PATENT DOCUMENTS

CN    1805594 A    7/2006

(Continued)

OTHER PUBLICATIONS

ETSI Standards, Lis, Sophia Antipolis Cedex, France, Universal Mobile Telecommunications System (UMTS); User Equipment (UE) procedures in idle mode and procedures for cell reselection in connected mode (3GPP TS 25.304 version 7.1.0 Release 7); ETSI TS 125 304, vol. 3-R2, No. V7.1.0, Dec. 1, 2006.

(Continued)

*Primary Examiner* — Nittaya Juntima
*Assistant Examiner* — Khoa Huynh
(74) *Attorney, Agent, or Firm* — Birch, Stewart, Kolasch & Birch, LLP (57) ABSTRACT

A method of transmitting data in a wireless communication system includes allocating persistent resources, monitoring a control channel according to the persistent resources so as to find a scheduling grant, the scheduling grant comprising information on uplink radio resources and transmitting data using the uplink radio resources by overriding the persistent resources when the scheduling grant on the control channel is found.

8 Claims, 8 Drawing Sheets

U.S. PATENT DOCUMENTS

| | | | |
|---|---|---|---|
| 7,623,483 | B2 | 11/2009 | Yi et al. |
| 2003/0157953 | A1 | 8/2003 | Das et al. |
| 2003/0181221 | A1 | 9/2003 | Nguyen |
| 2003/0210669 | A1 | 11/2003 | Vayanos et al. |
| 2004/0146067 | A1 | 7/2004 | Yi et al. |
| 2005/0058078 | A1 | 3/2005 | Jung et al. |
| 2005/0068900 | A1 | 3/2005 | Stephens et al. |
| 2005/0122898 | A1 | 6/2005 | Jang et al. |
| 2005/0250506 | A1 | 11/2005 | Beale et al. |
| 2006/0152083 | A1 | 7/2006 | Fuhr et al. |
| 2006/0176811 | A1 | 8/2006 | Yang et al. |
| 2006/0176856 | A1 | 8/2006 | Yang et al. |
| 2006/0251105 | A1 | 11/2006 | Kim et al. |
| 2007/0014229 | A1 | 1/2007 | Helper et al. |
| 2007/0047452 | A1 | 3/2007 | Lohr et al. |
| 2007/0091810 | A1 | 4/2007 | Kim et al. |
| 2008/0045272 | A1* | 2/2008 | Wang et al. .................. 455/561 |
| 2008/0117891 | A1* | 5/2008 | Damnjanovic et al. ....... 370/345 |
| 2008/0273610 | A1* | 11/2008 | Malladi et al. ................ 375/260 |
| 2009/0028123 | A1 | 1/2009 | Terry et al. |
| 2009/0303939 | A1 | 12/2009 | Umesh et al. |
| 2010/0091721 | A1 | 4/2010 | Larmo et al. |

FOREIGN PATENT DOCUMENTS

| | | |
|---|---|---|
| EP | 143226141 A1 | 6/2004 |
| EP | 1724948 A1 | 11/2006 |
| EP | 1 748 593 A1 | 1/2007 |
| EP | 1755355 A1 | 2/2007 |
| EP | 1843504 A2 | 10/2007 |
| EP | 1845649 A2 | 10/2007 |
| EP | 1845650 A2 | 10/2007 |
| JP | 2006-352708 A | 12/2006 |
| JP | 2009-535957 A | 10/2009 |
| KR | 10-0404178 B1 | 11/2003 |
| RU | 2280327 C2 | 4/2005 |
| WO | WO-97/11566 A2 | 3/1997 |
| WO | WO-98/24250 A2 | 6/1998 |
| WO | WO-02/093296 A2 | 11/2002 |
| WO | WO-03/085874 A1 | 10/2003 |
| WO | WO 03/096149 A2 | 11/2003 |
| WO | WO-03/096567 A1 | 11/2003 |
| WO | WO 2005/119941 A1 | 12/2005 |
| WO | WO-2006/022876 A1 | 3/2006 |
| WO | WO-2006/052208 A1 | 5/2006 |
| WO | WO-2006/105333 A1 | 10/2006 |
| WO | WO-2006/118418 A2 | 11/2006 |
| WO | WO 2007/125428 A2 | 11/2007 |

OTHER PUBLICATIONS

ETSI Standards, Lis, Sophia Antipolis Cedex, France, "Universal Mobile Telecommunications System (UMTS); HIgh Speed Downlink Packet Access (HSDPA); Overall description; Stage 2 (3GPP TS 25.308 version 7.1.0 Release 7); ETSI TS 125 308," vol. 3-R2. No. V7.1.0, Dec. 1, 2006, EX014039997.

Nokia: "ARQ Operation With HARQ-ARQ Interaction," 3GPP TSG-RAN WG2, R2-062765 [online], Oct. 9, 2006, [retrieved on Nov. 23, 2008], XP003012349. Retrieved from the Internet: <URL:http://www.3gpp1.com/ftp/tsg_ran/WG2_RL2/TSGR2_55/Documents/R2-062765.zip> sections 2, 3.

Erisccon: "Uplink HARQ-ARQ Interactions for NACK -> ACK Error," 3GPP TSG-RAN WG2, R2-063238 [online], Nov. 6, 2006 [retrieved on Nov. 23, 2008], XP050132733. Retrieved from the Internet: <URL:http://www.3gpp.org/ftp/tsg_ran/WG2_RL2/TSGR2_56/Documents/R2-063238.zip> Fig. 1, p. 2.

Samsung: "MAC functions: ARQ," 3GPP TSG-RAN WG2, R2-060374 [online], Feb. 13, 2006 [retrieved on Nov. 23, 2008], XP002488423. Retrieved from the Internet: <URL:ftp://ftp.3gpp.org/tsg_ran/WG2_RL2/TSGR2_51/Documents/R2-060374.zip> section 2.

Herrmann et al., "Improving Packet Loss Probability in the UMTS High-Speed Downlink," InL IEEE Vehicular Technology Conference, VTC 2003 Fall, 2003, New York: IEEE, Oct. 6, 2003, pp. 2655-2659, XP01071537, ISBN 0-7803-7954-3, ISSN 1090-3038, Abstract.

Rapporteur (Motorola): "Report of E-Mail Discussion: DL Scheduling," E-mail Discussion (Summary 1), TSG-RAN WG2, Dec. 12, 2006, 12 pages, R2-063.

Texas Instruments: "Control Channel Structure and Coding in E-UTRA Downlink," Discussion and Decision, 6.12.2, 3GPP TSG RAN WG#47, Riga, Latvia, Nov. 6-10, 2006, R1-063220, pp. 1-9.

Samsung: "DL control channel structure: overview," Discussion and Decision, 6.12.1, 3GPP TSG RAN WG1 Meeting#46bis, Seoul, Korea, Oct. 9-13, 2006, RI-062534, pp. 1-4.

Sharp: "UE Identity in L1/L2 Control Signaling for Downlink Scheduling Resource Allocation," Discussion and Decision, 11.11, 3GPP TSG-RAN WG2#53, Shanghai, China, May 8-12, 2006, R2-061129, pp. 1-5.

Ericsson: "E-UTRA Downlink Control Signaling—Open Issues," Discussion, 11.1.1, TSG-RAN WG1 #45, Shanghai, China, May 8-12, 2006, R1-061365, 5 pages.

LG Electronics: "Downlink control signaling," Discussion and Decision, 6.12.2, 3GPP TSG RAN WG1 #47, Riga, Latvia, Nov. 6-10, 2006, R1-063177, pp. 1-6.

Nokia: "Further discussion on delay enhancements in Re17", 3GPP TSG-RAN WG2 Meeting #53, Shanghai, China, May 8-12, 2006, R2-061189, pp. 1-5.

\* cited by examiner

[Fig. 1]

RELATED ART

[Fig. 2]

RELATED ART

[Fig. 3]

RELATED ART

[Fig. 4]

RELATED ART

[Fig. 5]

RELATED ART

METHOD AND APPARATUS OF TRANSMITTING DATA IN A WIRELESS COMMUNICATION SYSTEM

This application is the National Phase of PCT/KR2008/000719 filed on Feb. 5, 2008, which claims priority under 35 U.S.C. 119(e) to U.S. Provisional Application No. 60/888,508 filed on Feb. 6, 2007 and under 35 U.S.C. 119(a) to Patent Application No. 10-2008-0009666, filed in Korea on Jan. 30, 2008, all of which are hereby expressly incorporated by reference into the present application.

TECHNICAL FIELD

The present invention relates to wireless communication, and more particularly, to a method of transmitting and receiving data in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with radio access technique that is highly competitive in the mid-term future. However, as requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, adequate power consumption of a user equipment, and the like are defined as requirements.

Resource scheduling includes dynamic scheduling and persistent scheduling. The dynamic scheduling uses scheduling information which is allocated by exchanging control signals whenever data is transmitted or received. The persistent scheduling uses predetermined scheduling information to transmit or receive data.

Figure 1:
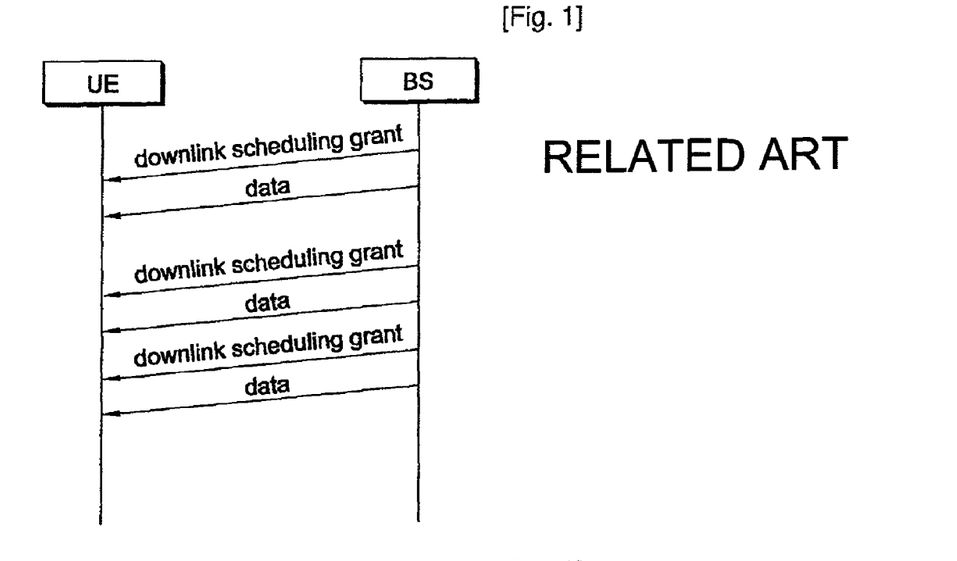
FIG. 1 is a flowchart illustrating downlink data transmission employing dynamic scheduling.

FIG. 1 is a flowchart illustrating downlink data transmission employing dynamic scheduling. A base station (BS) transmits scheduling information to a user equipment (UE) through a downlink scheduling grant every time before the BS transmits downlink data. There is an advantage in that the BS can adequately schedule radio resources for the downlink data according to downlink channel condition.

Figure 2:
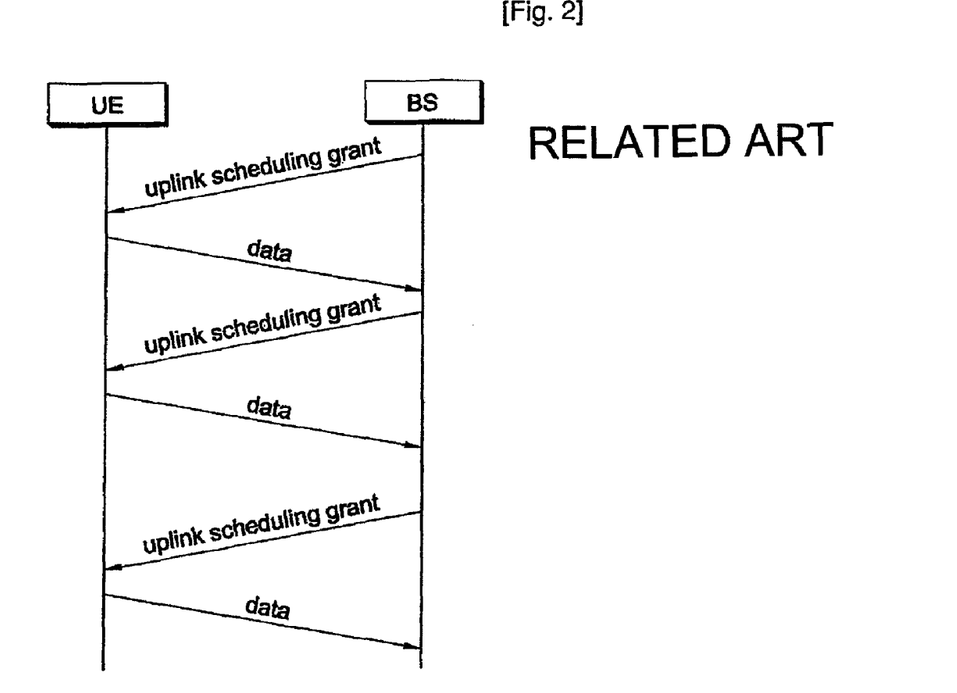
FIG. 2 is a flowchart illustrating uplink data transmission employing dynamic scheduling.

FIG. 2 is a flowchart illustrating uplink data transmission employing dynamic scheduling. Radio resources are allocated through an uplink scheduling grant from the BS before the UE transmits uplink data.

Figure 3:
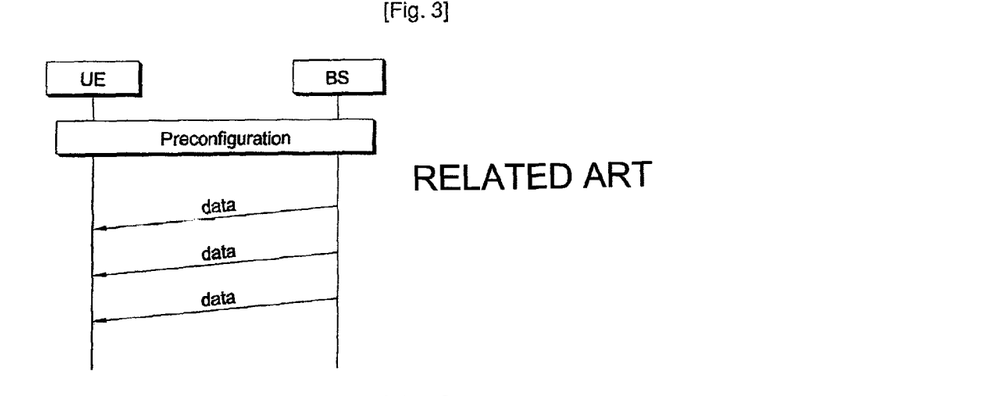
FIG. 3 is a flowchart illustrating downlink data transmission employing persistent scheduling.

FIG. 3 is a flowchart illustrating downlink data transmission employing persistent scheduling. The BS and the UE preconfigure radio resources before transmitting downlink data, and the BS transmits downlink data according to the preconfigured radio resources.

Figure 4:
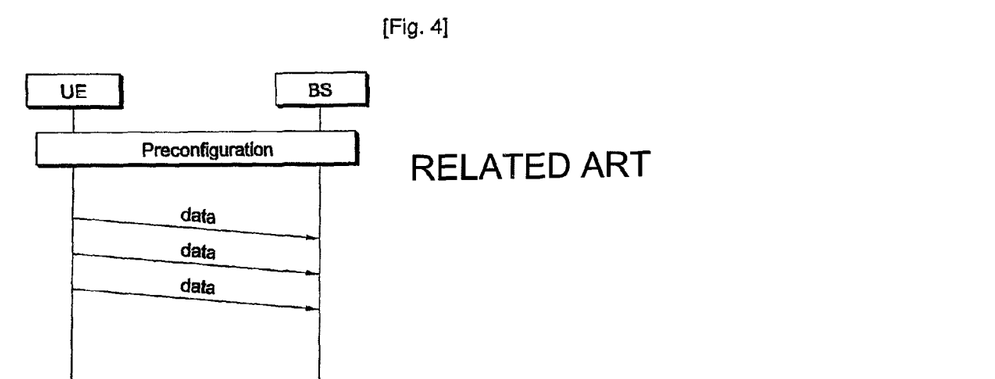
FIG. 4 is a flowchart illustrating uplink data transmission employing persistent scheduling.

FIG. 4 is a flowchart illustrating uplink data transmission employing persistent scheduling. The BS and the UE preconfigure radio resources before transmitting uplink data, and the UE transmits uplink data according to the preconfigured radio resources.

VoIP (Voice over IP) is a service for transmitting voice data over IP (Internet Protocol) and provides voice data, which was conventionally provided in a circuit-switched (CS) domain, in a packet-switched (PS) domain.

In the CS-based voice service, end-to-end connection is maintained and voice data is transmitted, whereas in the VoIP, connection-less voice data is transmitted. Accordingly, the VoIP is advantageous in that network resources can be used very efficiently.

With the development of wireless communication technology, required capacity of user data is increased fastly. For an efficient use of network resources, existing CS-based services has been replaced with the PS-based services. The VoIP has been developed in this circumstance, and it is expected that most of the voice services is provided through the VoIP in the future.

A RTP (Real-time Transport Protocol) is developed so as to provide the PS-based voice services effectively. A RTCP (RTP Control Protocol) is a protocol for controlling the RTP. The RTP has time stamp information loaded on each packet and, therefore, can solve a jitter problem. An FER (Frame Error Rate) can be reduced through rate control by reporting the loss of RTP packets through the RTCP. In addition to the RTP/RTCP, a SIP (Session Initiation Protocol), a SDP (Session Description Protocol) and so on were also developed. It sustains end-to-end virtual connection, thereby solving a delay problem considerably.

Figure 5:
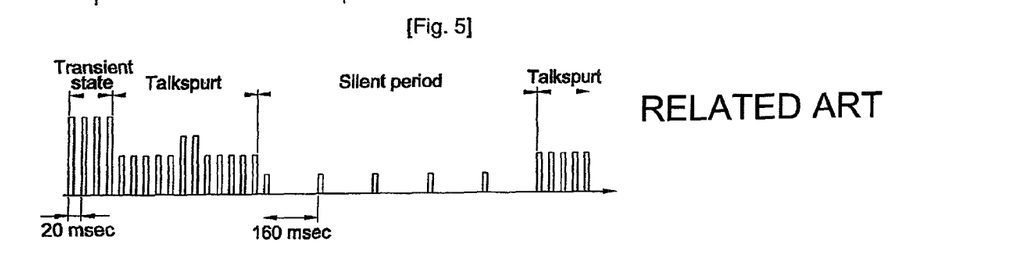
FIG. 5 illustrates traffic model at VoIP.

FIG. 5 illustrates a traffic model at the VoIP.

Referring to FIG. 5, voice packets generated at the VoIP include packets generated in a talkspurt and packets generated in a silent period. For example, assuming 12.2 kbps AMR (Adaptive Multi-Rate), in the talkspurt, a RTP packet is generated at a cycle of 20 ms and has a byte size of 35 to 49, and in the silent period, a RTP packet is generated at a cycle of 160 ms and has a byte size of 10 to 24.

If a packet is generated at a constant cycle in a voice service such as VoIP, the size of a packet is relatively small and constant and, therefore, the persistent scheduling is generally applied. Radio resources are allocated persistently during configuring a radio bearer. Thus, packets can be transmitted or received even without exchanging control signals including scheduling information.

When data is transmitted or received according to the persistent scheduling, scheduling information is not provided and preconfigured radio resources are employed. If channel condition changes after configuring the radio resource under persistent scheduling, error rate can be increased.

DISCLOSURE OF INVENTION

Technical Problem

A method is sought to update radio resources according to a channel condition under persistent scheduling.

Technical Solution

In an aspect, a method of transmitting data in a wireless communication system is provided. The method includes allocating persistent resources, monitoring a control channel according to the persistent resources so as to find a scheduling grant, the scheduling grant comprising information on uplink radio resources and transmitting data using the uplink radio resources by overriding the persistent resources when the scheduling grant on the control channel is found.

In another aspect, a method of receiving data in a wireless communication system is provided. The method includes allocating persistent resources, monitoring a control channel according to the persistent resources so as to find a scheduling grant, the scheduling grant comprising information on downlink radio resources and receiving data using the downlink radio resources by overriding the persistent resources when the scheduling grant on the control channel is found.

In still another aspect, a method of transmitting data in a wireless communication system is provided. The method includes allocating persistent resources, transmitting a scheduling grant on a control channel according to the persistent resources, the scheduling grant comprising information on downlink radio resources and transmitting data using the downlink radio resources by overriding the persistent resources.

Advantageous Effects

Even after persistent resources are allocated, radio resources can be changed according to a channel condition. Accordingly, the error rate for uplink data or downlink data can be reduced.

MODE FOR THE INVENTION

Figure 6:
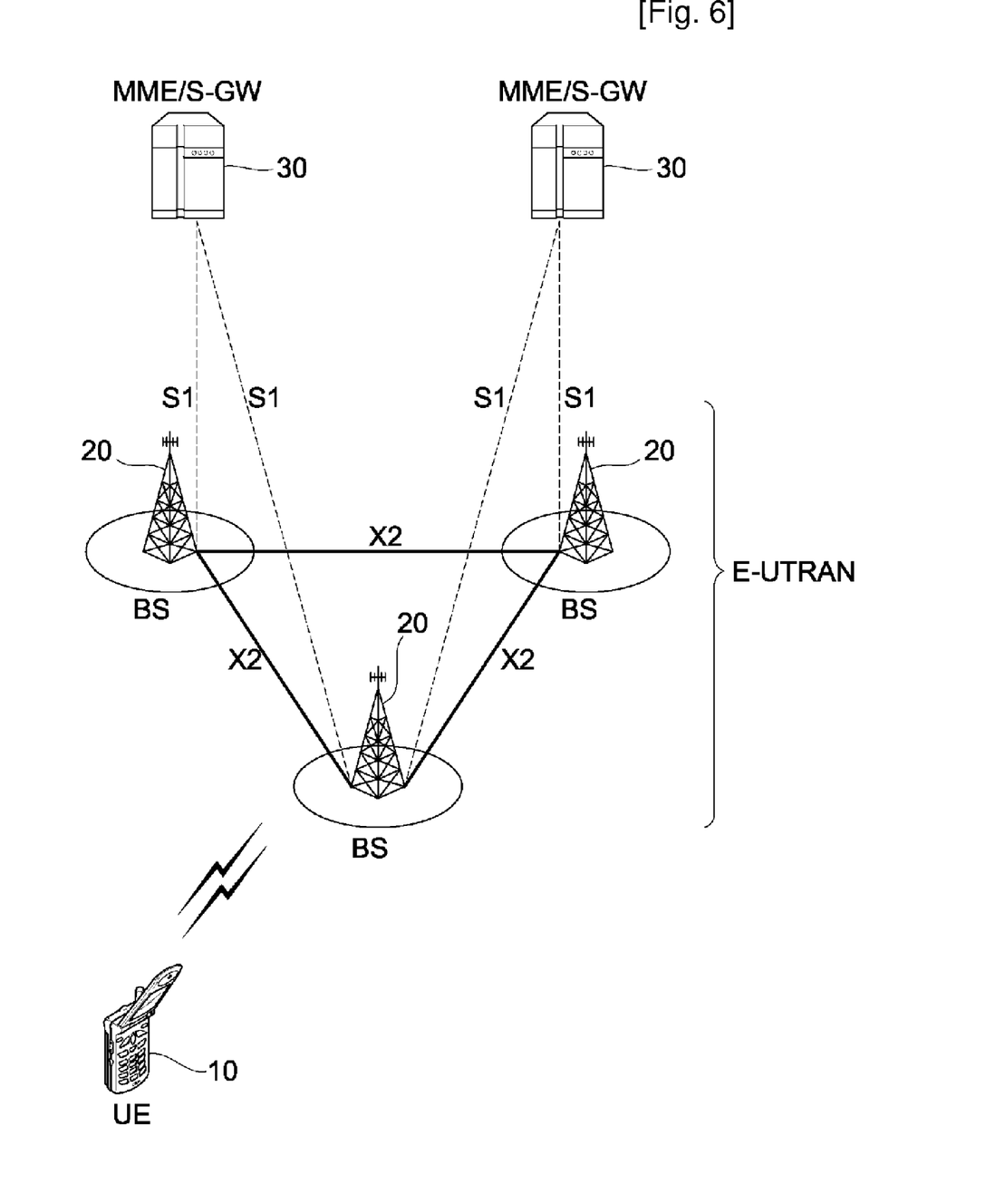
FIG. 6 is a block diagram showing a wireless communication system.

FIG. 6 is a block diagram showing a wireless communication system. This may be a network structure of an E-UMTS (Evolved-Universal Mobile Telecommunications System). The E-UMTS can also be referred to as a LTE (Long Term Evolution) system. The wireless communication system can widely be deployed to provide a variety of communication services, such as voice and packet data, and the like.

Referring to FIG. 6, an E-UTRAN includes at least one base station (BS) 20 providing user plane and control plane protocol terminations towards a user equipment.

A user equipment (UE) 10 can be fixed or mobile and can be referred to as another terminology, such as a MS (Mobile Station), a UT (User Terminal), a SS (Subscriber Station), a wireless device, or the like. The BS 20 generally is a fixed station that communicates with the user equipment 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. Hereinafter, downlink means communication from the BS 20 to the UE 10, and uplink means a communication from the UE 10 to the BS 20.

The BSs 20 can be coupled with each other through an X2 interface. The BS 20 is coupled with an EPC, more specifically, an MME (Mobility Management Entity)/S-GW (Serving Gateway) 30 through an S1 interface. The S1 interface supports many-to-many-relation between the BS 20 and the MME/S-GW 30.

The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MME/S-GW 30 and the BS 20.

Figure 7:
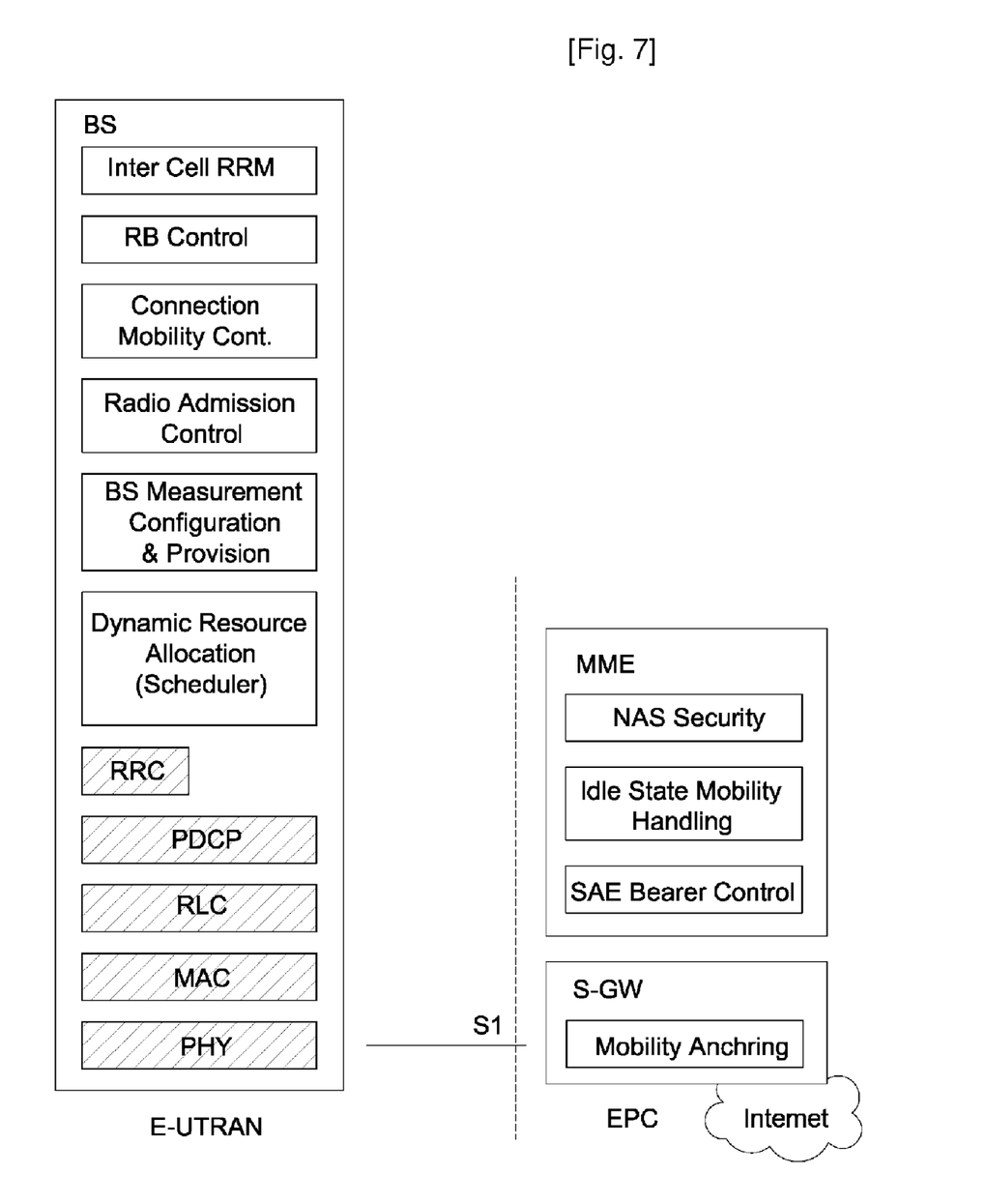
FIG. 7 is a block diagram showing functional split between an E-UTRAN and an EPC.

FIG. 7 is a block diagram showing functional split between the E-UTRAN and the EPC.

Referring to FIG. 7, slashed boxes depict radio protocol layers and white boxes depict the functional entities of the control plane.

The BS hosts the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling.

The MME hosts the following functions. (1) Distribution of paging messages into BSs, (2) Security control, (3) Idle state mobility control, (4) SAE bearer control, and (5) Ciphering and integrity protection of NAS (Non-Access Stratum) signalling.

The S-GW hosts the following functions. (1) Termination of user plane packet for paging and (2) User plane switching for the support of UE mobility.

Figure 8:
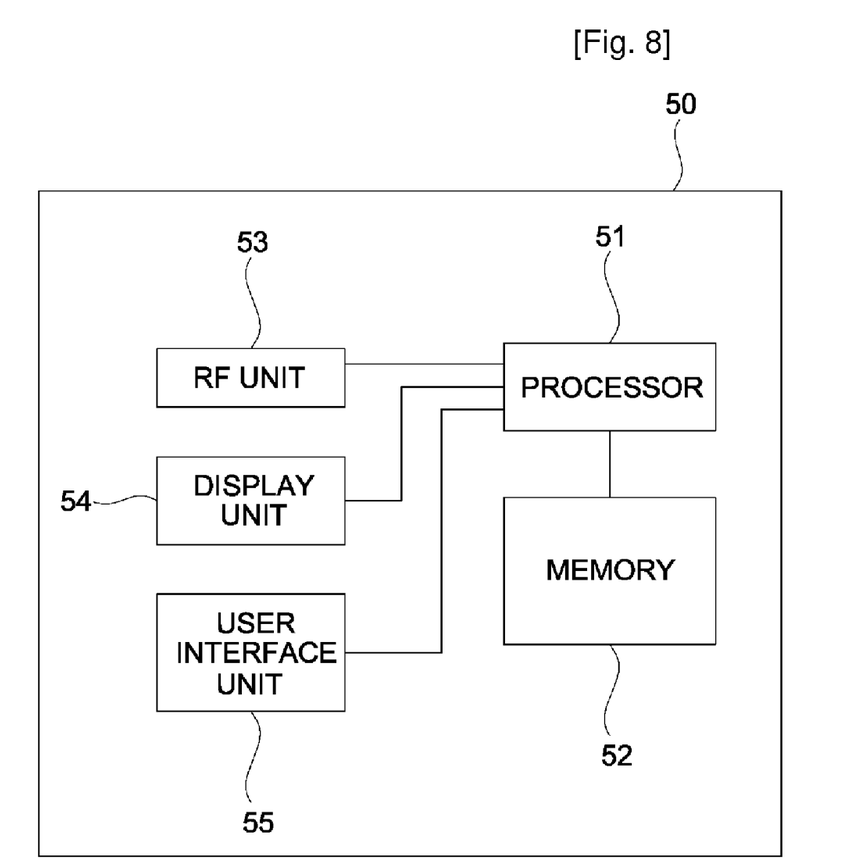
FIG. 8 is a block diagram showing constitutional elements of a UE.

FIG. 8 is a block diagram showing constitutional elements of a UE. A UE 50 includes a processor 51, memory 52, a RF unit 53, a display unit 54 and a user interface unit 55. Layers of the radio interface protocol are implemented in the processor 51. The processor 51 provides a control plane and a user plane. The function of each layer can be implemented in the processor 51. The memory 52 is coupled to the processor 51 and stores an operating system, applications, and general files. The display unit 54 displays a variety of information of the UE and may use a well-known element, such as an LCD (Liquid Crystal Display) or OLED (Organic Light Emitting Diode. The user interface unit 55 can be configured with a combination of well-known user interfaces such as a keypad or touch screen. The RF unit 53 is coupled to the processor 51 and transmits and/or receives radio signals.

Layers of the radio interface protocol between the UE and a network can be divided into L1 (a first layer), L2 (a second layer), and L3 (a third layer) based on the lower three layers of the OSI model that is well-known to communication systems. Of them, a PHY (physical) layer belonging to the first layer provides a service information transfer service employing a physical channel, and a RRC (Radio Resource Control) layer located in the third layer functions to control radio resources between the UE and the network. To this end, the RRC layer exchanges RRC messages with the UE and the network.

Layers of the radio interface protocol between the user equipment and the base station can be classified into L1 layer (a first layer), L2 layer (a second layer), and L3 layer (a third layer) based on the lower three layers of the Open System Inter-connection (OSI) model that is well-known in the related art. A physical (PHY) layer belonging to the first layer provides information transfer service on a physical channel. A radio resource control (RRC) layer belonging to the third layer serves to control radio resources between the user equipment and the network. The user equipment and the network exchange RRC messages via the RRC layer.

Figure 9:
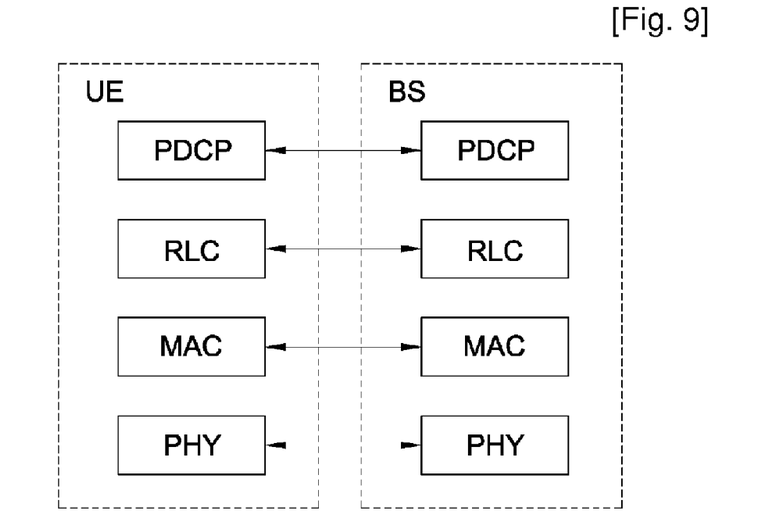
FIG. 9 is a block diagram showing radio protocol architecture for user plane.
Figure 10:
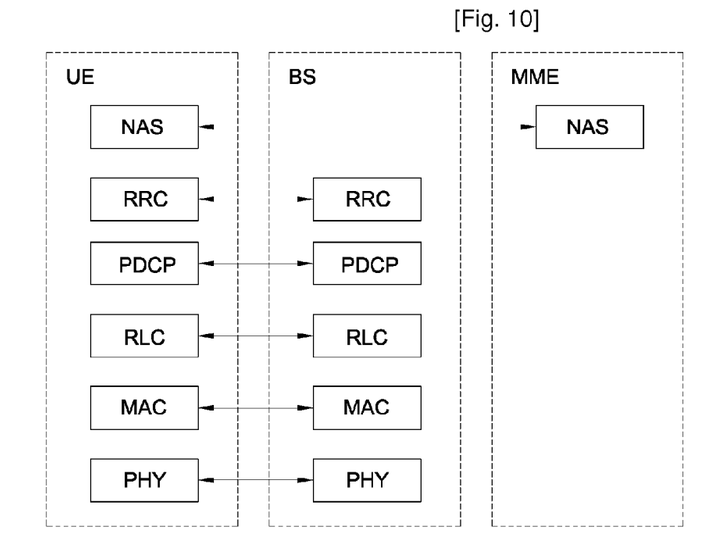
FIG. 10 is a block diagram showing radio protocol architecture for control plane.

FIG. 9 is a block diagram showing radio protocol architecture for a user plane. FIG. 10 is a block diagram showing radio protocol architecture for a control plane. They illustrate the architecture of a radio interface protocol between the UE and the E-UTRAN. The data plane is a protocol stack for user data transmission and the control plane is a protocol stack for control signal transmission.

Referring to FIGS. 9 and 10, a physical layer (PHY) belongs to the first layer provides an upper layer with an information transfer service on a physical channel. The PHY layer is coupled with a MAC (Medium Access Control) layer, i.e., an upper layer of the PHY layer, through a transport channel. Data is transferred between the MAC layer and the PHY layer through the transport channel. Between different physical layers, i.e., the physical layer of a transmitter and the physical layer of a receiver, data are transferred through the physical channel. The physical layer can be modulated by orthogonal frequency division multiplexing (OFDM). Time and/or frequency can be utilized as radio resources.

The MAC layer in the second layer provides services to a RLC (Radio Link Control) layer, i.e., an upper layer of the MAC layer, through a logical channel. The RLC layer in the second layer supports reliable data transfer. There are three operating modes in the RLC layer, such as TM (Transparent Mode), UM (Unacknowledged Mode) and AM (Acknowledged Mode) according to a data transfer method. The AM RLC provides bidirectional data transmission service and supports re-transmission when the transfer of a RLC PDU (Protocol Data Unit) is failed.

A PDCP (Packet Data Convergence Protocol) belonging to the second layer performs header compression function. When transmitting an Internet Protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A RRC (Radio Resource Control) layer of a third layer is defined only in the control plane. The RRC layer is pertinent to configuration, re-configuration and release of RBs (Radio Bearers) and is responsible for control of the logical channel, the transport channel and the physical channel. The RB refers to a service provided by the second layer for data transfer between the UE and the E-UTRAN. When there is RRC connection between the RRC layer of a UE and the RRC layer of a network, the UE is placed in RRC connected mode, and otherwise in RRC idle mode.

A RRC (Radio Resource Control) layer belonging to the third layer is defined only in the control plane. The RRC layer serves to control the logical channel, the transport channel, and the physical channel in association with configuration, reconfiguration and release of radio bearers (RBs). A RB means a service provided by the second layer for data transmission between the user equipment and the network. When a RRC connection is established between the RRC layer of the user equipment and the RRC layer of the network, it is called that the user equipment is in the RRC connected mode. When a RRC connection is not established yet, it is called that the user equipment is in the RRC idle mode.

A NAS (Non-Access Stratum) layer belongs to the upper layer of the RRC layer serves to perform session management and mobility management.

Downlink transport channels are a BCH (Broadcast Channel) for transmitting system information, a DL-SCH (Downlink-Shared Channel) for transmitting user traffic or control messages, and so on. User traffic of downlink multicast or broadcast service or control messages can be transmitted on the DL-SCH or a downlink MCH (Multicast Channel). Uplink transport channels are a RACH (Random Access Channel) for transmitting an initial control message and a UL-SCH (Uplink-Shared Channel) for transmitting user traffic or control message.

Downlink physical channels mapped to the downlink transport channels are a PBCH (Physical Broadcast Channel) mapped to the BCH, a PMCH (Physical Multicast Channel) mapped to the MCH, a PDSCH (Physical Downlink shared Channel) mapped to the PCH and the DL-SCH, and a PDCCH (Physical Downlink Control Channel) for transmitting control information such as downlink or uplink scheduling grant, which are provided from the first layer and the second layer. The PDCCH is also referred to as a downlink L1/L2 control channel. Uplink physical channels mapped to the uplink transport channels are a PUSCH (Physical Uplink Shared Channel) mapped to the UL-SCH, a PRACH (Physical Random Access Channel) mapped to the RACH, and a PUCCH (Physical Uplink Control Channel) for transmitting control information such as HARQ (hybrid automatic repeat request) ACK/NACK signals, a scheduling request signal, and a CQI (Channel Quality Indicator), which are provided from the first layer and the second layer.

In measurement reporting, a UE measures various information and provides the measured information to a network in order to support adequate network management and resource scheduling by taking radio environment into consideration. Measurements can be performed in a variety of ways, but measurements controlled by the RRC message are related to measurement to be performed by the UE. Although the measurements can also be performed by a network, those are not controlled by the RRC message. Measurement-related information is broadcasted on system information or transferred to the UE through a measurement control message or the like. The UE reports measurement results to the network periodically or non-periodically.

Figure 11:
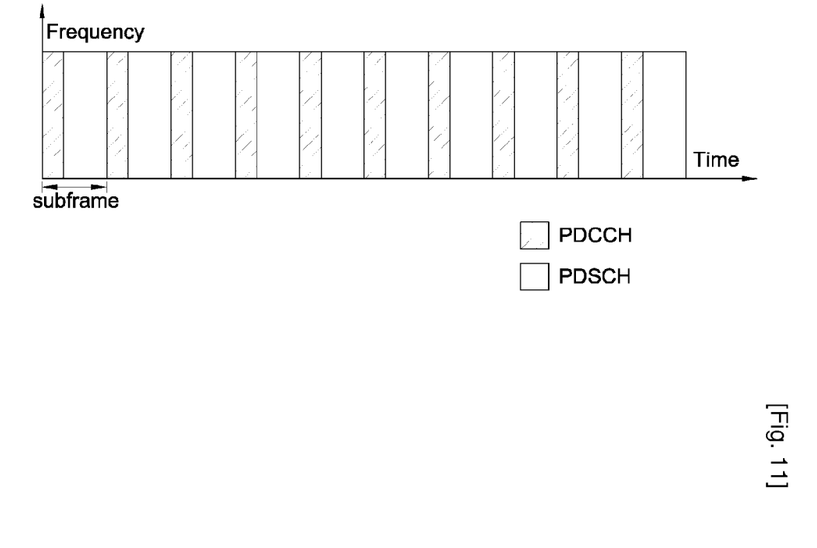
FIG. 11 shows a subframe format.

FIG. 11 illustrates a subframe format.

Referring to FIG. 11, a physical channel is comprised of OFDM symbols on the time domain and subcarriers on the frequency domain. The subframe comprises a plurality of OFDM symbols and a plurality of subcarriers. The subframe is an unit for allocating radio resources at one time. One subframe includes a plurality of resource blocks and one resource block includes a plurality of subcarriers (for example, 12 subcarriers). The subframe can be divided into a control region where the PDCCH is allocated and a data region where the PDSCH is allocated. For example, the three preceding OFDM symbols of the subframe can be allocated to the PDCCH. Time where one subframe is transmitted is called a TTI (Transmission Time Interval), for example, 1 TTI=1 ms. One subframe can includes two slots in the time domain. When 1 TTI=1 ms, 1 slot can have the length of 0.5 ms.

Figure 12:
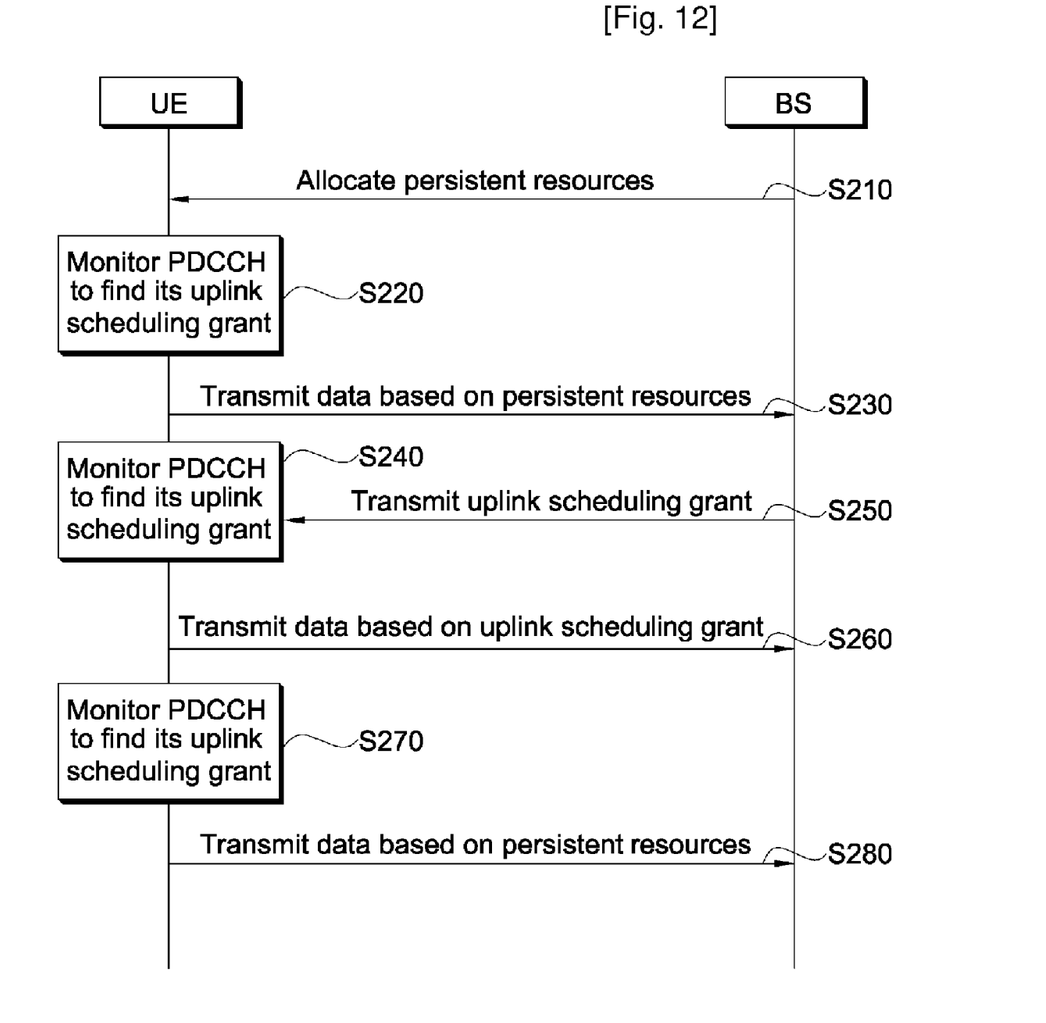
FIG. 12 is a flowchart illustrating an uplink data transmission method according to an embodiment of the present invention.

FIG. 12 is a flowchart illustrating an uplink data transmission method according to an embodiment of the present invention.

Referring to FIG. 12, a BS allocates persistent resources to a UE (S210). The BS can allocate the persistent resources using a RRC message according to persistent scheduling. The RRC message can be a measurement control message. The persistent resources include time/frequency resources, a starting point such as a system frame number, information about an interval, information about transmission format such as modulation and coding rate, information about a HARQ process identifier and a redundancy version necessary for a HARQ operation, and the like. The persistent resources also include a transmission interval of a subframe used to transmit uplink data, an allocated resource size, and so on.

The UE monitors a PDCCH in order to confirm whether its uplink scheduling grant is transmitted on the PDCCH according to the persistent resources (S220). The uplink scheduling grant includes information on uplink radio resources. The UE monitors the PDCCH in a subframe at a transmission interval defined by the persistent resources in order to find its uplink scheduling grant. For example, if the UE's unique identifier (for example, a C-RNTI (Cell Radio Network Temporary Identifier)) is found on the PDCCH, it can be seen that its uplink scheduling grant is transmitted on a corresponding PDCCH. The PDCCH can be monitored according to the persistent resources, but not monitored during the remaining periods in order to save power consumption of the UE.

If its uplink scheduling grant is not found, the UE transmits data to the BS based on the persistent resources (S230). The data can be transmitted on a PDSCH. The UE transmits the data according to the persistent resources, which are previously defined.

In the next interval, the UE monitors the PDCCH in order to confirm whether its uplink scheduling grant is transmitted on the PDCCH according to the persistent resources (S240). When the BS wants to change the persistent resources, the BS transmits the uplink scheduling grant to the UE on the PDCCH (S250). The BS has information on the persistent resources and therefore can know a point of time at which the UE monitors the PDCCH. The BS transmits the uplink scheduling grant on the PDCCH in the subframe which is monitored by the UE. For example, even though information of the persistent resources has been set to transmit data at the frequency of C, the information of the persistent resources can be changed to transmit data at the frequency of D through the uplink scheduling grant, if appropriate.

When the uplink scheduling grant is found, the UE overrides the persistent resources and transmits data using the uplink radio resource indicated by the uplink scheduling grant (S260).

In the next interval, the UE monitors the PDCCH in order to confirm whether its uplink scheduling grant is transmitted on the PDCCH according to the persistent resources (S270). When its uplink scheduling grant is not found, the UE transmits data based on the persistent resources (S280).

If its uplink scheduling grant is found on the PDCCH, the UE transmits data based on the uplink scheduling grant at a corresponding TTI. If its uplink scheduling grant is not found in the subsequent interval, the UE transmits data based on the persistent resources.

In accordance with dynamic scheduling, the UE checks the uplink scheduling grant at every TTI and transmits data. Since the uplink scheduling grant is confirmed only at the predetermined interval according to the persistent resources, power consumption of the UE, which is caused by monitoring of the PDCCH, can be reduced. Further, the error rate can be reduced by changing radio resources through the uplink scheduling grant according to a channel condition.

Meanwhile, the uplink scheduling grant can include information on a temporary interval which is used to transmit data using the uplink radio resources indicated by the uplink scheduling grant. The temporary interval is an interval where the persistent resources are overridden and transmission is performed based on the uplink scheduling grant. In the case where a UE allocated with the persistent resources according to persistent scheduling receives an uplink scheduling grant on a PDCCH, the UE transmits data using the radio resources included in the uplink scheduling grant during temporary interval. After the temporary interval elapses, the UE transmits data using the persistent resources. For example, assuming that persistent resources is 'A' and radio resources included in the uplink scheduling is 'B', the UE transmits data using the A and then transmits data using the B during the temporary interval when the B is received on the PDCCH. After the temporary interval elapses, the UE transmits data again using the A.

In the case where radio resources is changed under the persistent scheduling, how long is the changed radio resources valid and whether to use the persistent resources again can be set through a variety of ways.

In an embodiment, a scheduling grant on a PDCCH can include information on a temporary interval regarding how long is corresponding radio resources valid and subsequently whether to return to persistent resources allocated according to persistent scheduling. For example, assuming that the temporary interval of 10 ms, a UE overrides persistent resources during 10 ms from a point of time where the scheduling grant is received and transmits or receives data based on scheduling grant. After 10 ms, the UE transmit or receives data based on the persistent resources.

In another embodiment, radio resources, which are changed from when a scheduling grant on the PDCCH is received to when data is transmitted successfully, can be employed, and after the transmission is successfully completed, radio resources according to persistent scheduling can be employed. For example, it is assumed that a UE is configured to transmit data at a time T based on persistent scheduling. The UE checks whether its scheduling grant is transmitted on the PDCCH at the time T. If its scheduling grant is found, the UE transmits data using the radio resource included in the scheduling grant. The data employs HARQ (Hybrid Automatic Repeat Request) transmission. If the BS is failed to decode the data, the BS transmits a NACK signal (i.e., a re-transmission request signal) to the UE. The UE that has received the NACK signal retransmits the data. Radio resources used in re-transmission can employ previously received scheduling grant information. If a new scheduling grant is received on the PDCCH at the time of retransmission, the UE overrides the previously received scheduling grant and retransmits data based on the new scheduling grant. If the data is received successfully, the BS transmits an ACK signal to the UE. After receiving the ACK signal, the UE transmits subsequent data based on persistent scheduling.

Figure 13:
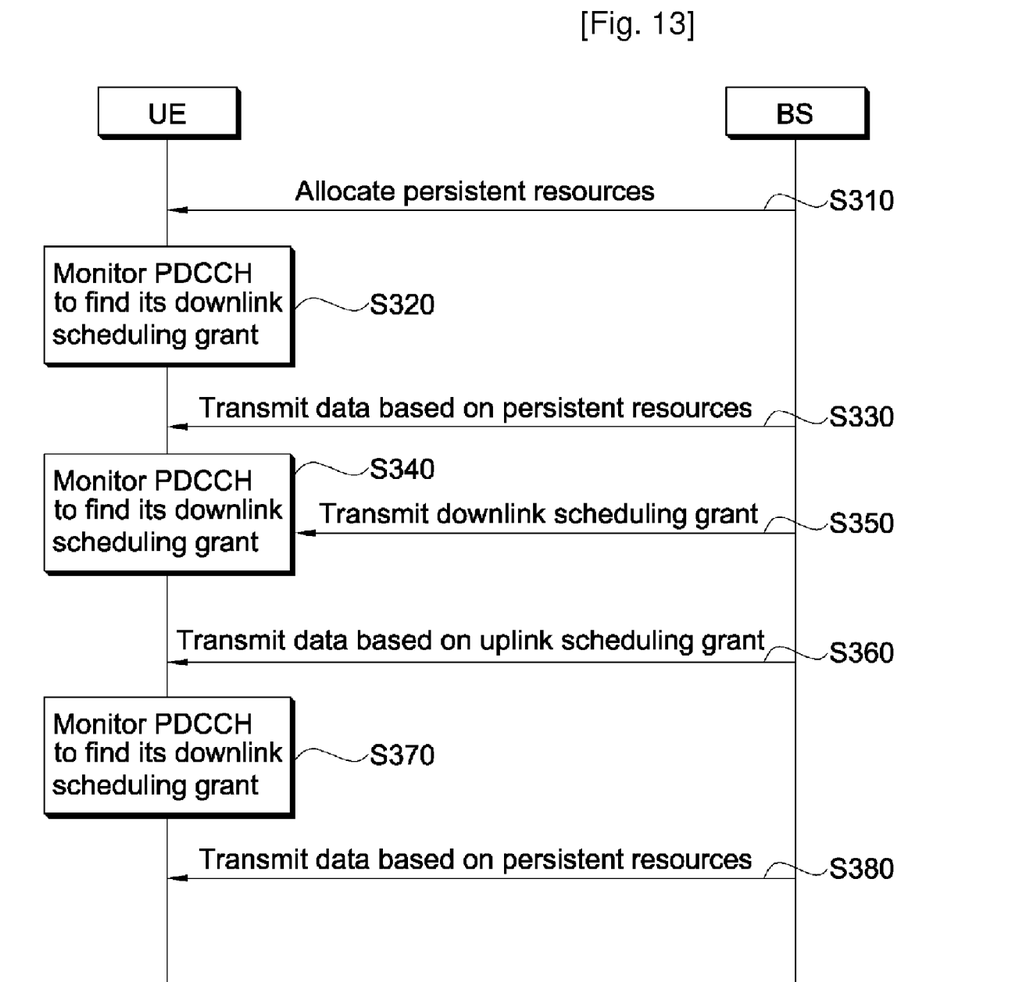
FIG. 13 a flowchart illustrating a downlink data transmission method according to an embodiment of the present invention.

FIG. 13 a flowchart illustrating a downlink data transmission method according to an embodiment of the present invention.

Referring to FIG. 13, a BS allocates persistent resources to a UE (S310).

The UE monitors a PDCCH in order to confirm whether its downlink scheduling grant is transmitted on the PDCCH according to the persistent resources (S320). The downlink scheduling grant includes resource allocation information for downlink transmission. The UE monitors the PDCCH in a subframe at the transmission interval defined by in the persistent resources, in order to find its downlink scheduling grant. For example, if its unique identifier (for example, a C-RNTI) is found on the PDCCH, it can be seen that its downlink scheduling grant is transmitted on the PDCCH.

The BS that has not transmitted a downlink scheduling grant transmits data to the UE based on the persistent resources (S330).

In a next interval, the UE monitors the PDCCH in order to confirm whether its downlink scheduling grant is transmitted on the PDCCH according to the persistent resources (S340). If the BS wants to change the persistent resources, the BS transmits a downlink scheduling grant to the UE through the PDCCH (S350).

After the downlink scheduling grant is transmitted to the UE, the BS overrides the persistent resources and transmits data using the radio resources included in the downlink scheduling grant (S360).

In the next interval, the UE monitors the PDCCH in order to confirm whether its downlink scheduling grant is transmitted on the PDCCH according to the persistent resources (S370). The BS that has not transmitted the downlink scheduling grant transmits data to the UE using the persistent resources (S380).

If its downlink scheduling grant is found on the PDCCH, the UE receives data based on the downlink scheduling grant at a corresponding TTI. If its downlink scheduling grant is not found in a subsequent interval, the UE receives data based on the persistent resources.

Even after persistent resources are allocated, radio resources can be changed according to a channel condition. Accordingly, the error rate for uplink data or downlink data can be reduced.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of transmitting data, by a user equipment, in a wireless communication system, the method comprising:

receiving allocated persistent uplink resources from a base station, the persistent uplink resources including a transmission interval of subframes used to transmit uplink data, the persistent uplink resources being allocated based on a radio resource control (RRC) message;

monitoring a physical downlink control channel (PDCCH) in a subframe where the persistent uplink resources are allocated so as to find an uplink scheduling grant, the uplink scheduling grant comprising information on uplink radio resources; and transmitting the uplink data to the base station based on the uplink radio resources in the subframe by overriding the persistent uplink resources if a cell radio network temporary identifier (C-RNTI) of the user equipment is found on the PDCCH, the C-RNTI being a unique identifier of the user equipment, or transmitting the uplink data to the base station based on the persistent uplink resources in the subframe if the C-RNTI of the user equipment is not found on the PDCCH, wherein the uplink radio resources overrides the persistent uplink resources until an acknowledgement (ACK) signal corresponding to the uplink data is received from the base station.

2. The method of claim 1, wherein the uplink scheduling grant includes a temporary interval which is an interval used to transmit the uplink data based on the uplink radio resources.

3. The method of claim 1, further comprising:

retransmitting the uplink data based on the uplink radio resources after receiving the request of retransmission of the uplink data.

4. The method of claim 1, wherein the PDCCH is monitored at every transmission interval for the uplink data.

5. A method of receiving data, by a user equipment, in a wireless communication system, the method comprising:

receiving allocated persistent downlink resources from a base station, the persistent downlink resources including a transmission interval of subframes used to receive downlink data, the persistent downlink resources being allocated based on a radio resource control (RRC) message;

monitoring a physical downlink control channel (PDCCH) in a subframe where the persistent downlink resources are allocated so as to find a downlink scheduling grant, the downlink scheduling grant comprising information on downlink radio resources; and receiving the downlink data from the base station based on the downlink radio resources in the subframe by overriding the persistent downlink resources if a cell radio network temporary identifier (C-RNTI) of the user equipment is found on the PDCCH, the C-RNTI being a unique identifier of the user equipment, or receiving the downlink data from the base station based on the persistent downlink resources in the subframe if the C-RNTI of the user equipment is not found on the PDCCH, wherein the downlink radio resources overrides the persistent downlink resources until the downlink data is received successfully from the base station.

6. The method of claim 5, wherein the downlink scheduling grant includes a temporary interval which is an interval used to receive the downlink data based on the downlink radio resources.

7. The method of claim 5, wherein the PDCCH is monitored at every transmission interval for the downlink data.

8. A method of transmitting data, by a base station, in a wireless communication system, the method comprising:

allocating persistent downlink resources to a user equipment based on a radio resource control (RRC) message, the persistent downlink resources including a transmission interval of subframes used to transmit downlink data;

transmitting a downlink scheduling grant on a physical downlink control channel (PDCCH) to the user equipment in a subframe where the persistent resources are allocated, the downlink scheduling grant comprising information on downlink radio resources; and transmitting the downlink data to the user equipment based on the downlink radio resources in the subframe by overriding the persistent resources if a cell radio network temporary identifier (C-RNTI) of the user equipment is found on the PDCCH by the user equipment, the C-RNTI being a unique identifier of the user equipment, or transmitting the downlink data to the user equipment based on the persistent downlink resources in the subframe if the C-RNTI of the user equipment is not found on the PDCCH by the user equipment, wherein the downlink radio resources overrides the persistent downlink resources until an acknowledgement (ACK) signal corresponding to the downlink data is received from the user equipment.

* * * * *